ǁ United States Patent [19]

DeWald et al.

[11] Patent Number: 5,174,420
[45] Date of Patent: Dec. 29, 1992

[54] WET DISC BRAKE

[75] Inventors: Gregory T. DeWald, Mooresville; Charles D. Schaber, Statesville, both of N.C.

[73] Assignee: Clark Equipment Company, South Bend, Ind.

[21] Appl. No.: 694,832

[22] Filed: May 2, 1991

[51] Int. Cl.⁵ .......................................... F16D 65/853
[52] U.S. Cl. ................................ 188/264 E; 188/71.5; 188/71.6; 188/170; 192/70.12; 192/91 R; 192/113 B
[58] Field of Search ................... 188/170, 264 E, 71.5, 188/71.6; 192/70.12, 70.13, 91 R, 113 B

[56] References Cited

U.S. PATENT DOCUMENTS

| | | |
|---|---|---|
| 2,823,770 | 2/1958 | Helvern . |
| 3,081,842 | 3/1963 | Zindler et al. . |
| 3,082,647 | 3/1963 | Banker . |
| 3,132,724 | 5/1964 | Ansteth . |
| 3,198,295 | 8/1965 | Fangman et al. ............... 188/264 E |
| 3,547,234 | 12/1970 | Cummins et al. . |
| 3,730,301 | 5/1973 | Heck et al. ..................... 188/71.6 |
| 3,831,718 | 8/1974 | Muller et al. . |
| 3,863,038 | 1/1975 | Kreitner et al. . |
| 3,927,737 | 12/1975 | Prillinger et al. . |
| 3,999,634 | 12/1976 | Howell ............................. 188/71.6 |
| 4,010,830 | 3/1977 | Logus et al. . |
| 4,057,297 | 11/1977 | Beck . |
| 4,077,500 | 3/1978 | Hickman, Sr. et al. . |
| 4,146,116 | 3/1979 | Cumming . |
| 4,245,724 | 1/1981 | Beck ................................ 188/170 |
| 4,263,991 | 4/1981 | Morgan et al. . |
| 4,274,680 | 6/1987 | Sieving et al. . |
| 4,346,791 | 8/1982 | Cumming . |
| 4,415,067 | 11/1983 | Cory . |
| 4,483,422 | 11/1984 | Cory . |
| 4,562,902 | 1/1986 | Scibbe . |
| 4,607,730 | 8/1986 | Paisley . |
| 4,645,039 | 2/1987 | Lewis et al. . |
| 4,893,879 | 1/1990 | Middelhoven et al. . |
| 4,989,476 | 2/1991 | Shimada et al. ............. 192/70.12 X |

FOREIGN PATENT DOCUMENTS 934142 8/1963 United Kingdom ............... 188/170

OTHER PUBLICATIONS

Excerpt from Power Transmission Design, Sep. 1984 entitled "Slippery Solution to a Hot Problem".
Excerpt from Dura-Disc Wet Disc Brake Brochure.

Primary Examiner—George E. A. Halvosa
Attorney, Agent, or Firm—Watts, Hoffmann, Fisher & Heinke Co.

[57] ABSTRACT

A spring applied - hydraulically released (SAHR) type wet disc brake for a wheeled vehicle having a large braking torque and energy absorption capacity. The brake unit includes a piston housing in which an annular piston is mounted for reciprocal movement towards and away from a disc housing defining a disc chamber in which a plurality of interleaved non-rotating and rotating discs are disposed. A pressure plate is mounted for reciprocating movement towards and away from the discs and is operative to apply clamping forces to the discs in order to generate braking torque. A plurality of biasing springs urges the pressure plate towards engagement with the disc pack. Pressurized fluid applied to the piston maintains the pressure plate in a released position. Selective reduction of pressure to the piston effects braking action. A piston-to-reaction plate seal inhibits coolant flow between an inner face of the pressure plate and the adjacent disc. A pressure plate seal carried by a periphery of the pressure plate sealingly engages the disc housing and inhibits coolant flow from the disc chamber, across the pressure plate. A coolant inlet distributes coolant throughout the periphery of the disc chamber. Coolant flows between the discs toward a central region from where it is exhausted through one of the spring chambers. Aligned locations defined by teeth removed from the rotating discs together with a wheel hub member form coolant passages. The pressure plate includes a plurality of standoffs engageable by the piston.

18 Claims, 6 Drawing Sheets

WET DISC BRAKE

TECHNICAL FIELD

The present invention relates generally to brake systems, and in particular to a wet disc brake unit for an off-highway vehicle.

BACKGROUND

Vehicle friction brake systems, and other friction systems, such as clutches, include a plurality of friction members, some of which rotate with respect to the others. Braking is obtained by the frictional engagement between the relatively rotating members. Many of these devices utilize fluid pressure actuated pistons for accomplishing the required movement in the friction components to obtain the frictional engagement. The piston or pistons generally include an effective pressure area to which fluid pressure is applied to create a force urging the piston in a brake applying or brake releasing direction. The prior art has suggested a variety of piston retraction mechanisms to obtain brake release.

In off-highway apparatus such as construction vehicles and mining equipment, a brake system is necessary which can bear up under the severe operating conditions. The brakes on these vehicles are often subjected to extremely large braking torques and braking applications for extended periods of time. The brakes are employed not only to stop vehicle motion, but are utilized in retarding vehicle speed when traveling downhill. The brake unit must have the capability of dissipating extremely large kinetic energies developed due to the large vehicle mass, especially when the brakes are applied for extended time periods. For this and other reasons, a brake system of the multi-disc type is often chosen for this application.

A typical multi-disc brake includes a series of interleaved, non-rotatable and rotatable friction disc plates. The rotatable disc plates are operatively connected to the wheel and the non-rotatable disc plates are coupled or "grounded" to the axle housing or other non-rotating wheel support structure. Both the rotatable and non-rotatable disc plates are mounted for axial movement with respect to the axle and are enclosed within a brake housing. Spline connections are generally employed to couple the plates and the brake member to which they are operatively engaged. To obtain braking in this type of brake, the interleaved disc plates must be compressed so that their friction surfaces engage to convert the mechanical energy associated with the rotation of the rotatable disc plates into heat, which is then dissipated. The stack of interleaved disc plates is generally compressed between a wall of the brake chamber in which it is enclosed, and a movable pressure plate. In at least some brake units, a fluid pressure operated piston or pistons engage the pressure plate and move it axially into abutting contact with the outermost friction disc causing subsequent engagement of all the disc plates.

To increase the heat dissipation rate of multi-disc brakes, the discs are sometimes operated in a fluid medium which flows through the brake housing, absorbing heat from the friction discs and then transfers it to a remote heat exchanger. The multi-disc brake, coupled with a cooling system, provides a brake system having an extremely large torque capacity in a relatively small package.

Some proposed systems have suggested the use of separate retraction springs coupled to the actuating piston to obtain brake release, so that when the pressurized fluid acting on the piston was terminated, the springs would force the piston to its released position. Other systems would employ separate fluid operated retraction pistons to effect the same result. Still others have suggested the utilization of a pressure plate biased towards brake application by a plurality of springs. The piston is arranged to oppose the spring applied force when the piston is subjected to fluid pressure. This type of brake is often termed a "spring applied hydraulically released"" or "SAHR" brake.

The emergency application of the vehicle brakes upon failure of the fluid pressure system has been addressed by some prior art brake systems. Suggested mechanisms have included spring biased emergency pistons normally held in a released position by a separate fluid pressure system. Upon brake failure, the emergency pressure system would deplete the pressure applied to the spring biased piston allowing it to engage the vehicle brakes. Other systems have used redundant fluid pressure operated pistons supplied with separate sources of fluid pressure. In a SAHR type brake, a failure in the hydraulic system causing a loss in hydraulic pressure to the piston results in the application of the brake by the biasing springs. In many of these suggested systems, the apparatus added significant complexity to the brake housing and more importantly, adversely affected the brake assembly size, making them unsuitable for many vehicle applications having brake size constraints. In those systems which would suggest the use of separate source of pressurized fluid, the control system necessary to effect reliable operation would be costly to manufacture and maintain.

DISCLOSURE OF THE INVENTION

The present invention provides a new and improved wet disc brake unit for a wheeled vehicle capable of generating a relatively high braking torque and having a relatively large energy absorption capacity while retaining a relatively small envelope size allowing it to be used on vehicles having small wheels such as mining vehicles.

According to the preferred and illustrated embodiment, the wet disc brake unit includes a piston housing that supports an annular piston for reciprocating movement. A disc housing is secured to the piston housing and defines a disc chamber in which a plurality of interleave, rotating and non-rotating discs are located. As is known the discs form a disc pack. An annular pressure plate is disposed adjacent to the disc pack and is operative to clamp and unclamp the discs in order to generate braking torque. Movement of the pressure plate towards and away from the disc pack is controlled by the annular piston.

According to a feature of the invention, a pressure plate-to-disc seal is used to inhibit the flow of coolant between the pressure plate and the disc that is immediately adjacent the pressure plate. In the preferred embodiment, the outermost disc of the disc pack, which is contacted by the pressure plate, is non-rotatable with respect to the pressure plate and hence very little heat, if any is generated between these brake members during braking. The disclosed seal arrangement inhibits coolant flow between the non-rotating disc and the pressure plate when the brake is in a released position.

In the preferred construction, the seal arrangement comprises an annular seal slidably carried on a cylindrical surface defined by the pressure plate. A radial end of the annular seal abuttably engages the first disc and is urged towards abutting contact by a spring means acting between the pressure plate and the seal. In the preferred construction, the spring comprises a Belleville-type spring which engages an opposite radial face of the annular seal.

With the disclosed seal arrangement, the flow of coolant is encouraged to flow between the interleaved non-rotating and rotating discs between which heat is generated during braking. Since the outboard disc in the disclosed embodiment does not rotate with respect to the pressure plate, heat is not generated between these two components and hence, any coolant flowing between these members when the brake is released would have very little heat transferred to it. With the disclosed sealing arrangement, coolant flow in areas where heat is generated is encouraged and enhanced.

According to the exemplary embodiment, the disclosed brake unit is of the spring-applied, hydraulically released (SAHR) type brake. In this type of brake, springs are used to apply the brakes and hydraulic pressure, under the control of a brake control valve, is used to release the brake. In this type of brake unit, the brakes are applied by a selectively reducing brake pressure in order to allow the springs to apply the brake.

In the disclosed and preferred embodiment, the pressure plate is urged towards engagement with the disc pack by a plurality of springs located in spring chambers formed in the disc housing. The brake piston is located on the opposite side of the disc pack and applies a force to the pressure plate which counters the spring-applied force.

According to a feature of the invention, the pressure plate is formed with a plurality of integrally formed stand-offs which extend axially from the pressure plate into abutting contact with the piston. In the preferred embodiment of this feature, the non-rotating or reaction discs are formed with peripheral slots through which the stand-offs extend in order to engage the piston. Preferably, the non-rotating discs include teeth that mate with internal splines formed in the brake disc housing which inhibit the reaction discs from rotating with respect to the housing and the pressure plate.

The slots formed in the discs merely form clearance spaces for the stand-offs. The reaction discs, in the preferred embodiment, do not engage the pressure plate stand-offs. According to this feature, as the piston, under the influence of pressurized fluid, moves towards the disc pack, the pressure plate stand-offs are engaged and the piston force opposes a spring force in order to move the pressure plate away from the disc pack, thereby releasing the brake. The brake is applied by selectively reducing the pressurized fluid applied to the piston to enable the spring biased pressure plate to engage and apply a clamping force to the disc pack.

According to the invention, coolant for cooling the discs that comprise the disc pack is introduced into the brake unit via an inlet that communicates with a peripheral region of the discs. Coolant admitted to the peripheral region flows between the disc members and into a central receiving region located near the inner periphery of the discs. The coolant then flows from the central region to an outlet through which the coolant is discharged. As is conventional, the coolant flows to a heat exchanger where it releases the heat absorbed during its traversal of the brake unit.

In the preferred embodiment, the coolant outlet is defined by one of the spring chambers, preferably a spring chamber located near or at the twelve o'clock position on the brake housing.

To further control coolant flow through the brake housing, a peripheral seal is used to seal an interface between the pressure plate and the brake disc housing. Preferably, an O-ring type seal is carried by a groove defined in the pressure plate which sealingly engages a cylindrical wall which slidably supports the pressure plate for reciprocating movement towards and away from the disc pack. According to a further aspect of this feature, an annular groove is defined between the pressure plate and housing which serves to distribute coolant throughout the peripheral region of the brake housing. With the disclosed arrangement, coolant introduced into the brake housing through the cooling inlet, is distributed via the distribution groove in the peripheral region of the disc pack. From there, the coolant flows through the non-rotating and rotating disc members (coolant flow is inhibited between the pressure plate and the outermost disc member), finally being received in a central region from where it is communicated to the spring chamber that defines the coolant outlet.

According to a further feature of the invention, the brake disc housing includes rigidizing structure engageable with mating structure on the piston housing which interengage upon assembly to control and inhibit deflection in the piston chamber. Preferably, an extension formed on a radial face of the brake housing engages and surrounds a stepped portion formed on the piston housing which resists radial movement in walls that define the piston chamber in the piston housing. In effect, a socket/projection type interconnection is established.

According to a further feature of the invention, at least some of the spring chambers include a pressure plate releasing element which is operable from outside the brake housing in order to retract the pressure plate should fluid pressure to the piston be unavailable. In the preferred embodiment, the retraction mechanism includes a pull rod attached to the pressure plate which extends axially towards an opening defined in the spring chamber. A plug member normally seals the aperture. Should manual release of the brake be necessary, the plug member is removed and a suitable retraction member, such as a retraction bolt, is threaded into the pull rod thereby pulling the pressure plate away from the disc pack (against the spring force) thereby releasing the clamping force on the disc pack.

According to still another feature of the invention, the pressure plate is formed with a shoulder or lip on its inner periphery which is engageable by a disc member alignment tool during assembly. According to this aspect of the invention, when a brake unit is installed on the vehicle and is to be reassembled, the assembly tool, which is held to the axle by a mounting member, engages the inner lip formed on the pressure plate. The assembly tool also includes mating splines for engaging and aligning the non-rotating and rotating discs located in the disc chamber. Jacking bolts forming part of the assembly tool push the pressure plate in the retracted direction against the force of the brake-applying springs, while maintaining alignment of the discs.

The piston housing is then mounted to the disc housing and once mounted, the tool is manipulated to release the pressure plate to allow the springs to clamp the pressure plate against the disc pack. The spring force applied through the pressure plate maintains the non-rotating and rotating discs in alignment to enable the assembly tool to be removed. A wheel member, including a splined drive member, can then be remounted on the axle in driving engagement with the rotating discs.

In the present invention, a brake unit having relatively high torque capacity with minimal envelope diameter is provided. The disclosed brake unit is capable of fitting applications with small wheel sizes without sacrificing brake capability.

Additional features of the invention will become apparent and a fuller understanding obtained by reading the following detailed description made in connection with the accompanying drawings.

BEST MODE FOR CARRYING OUT THE INVENTION

Figure 1:
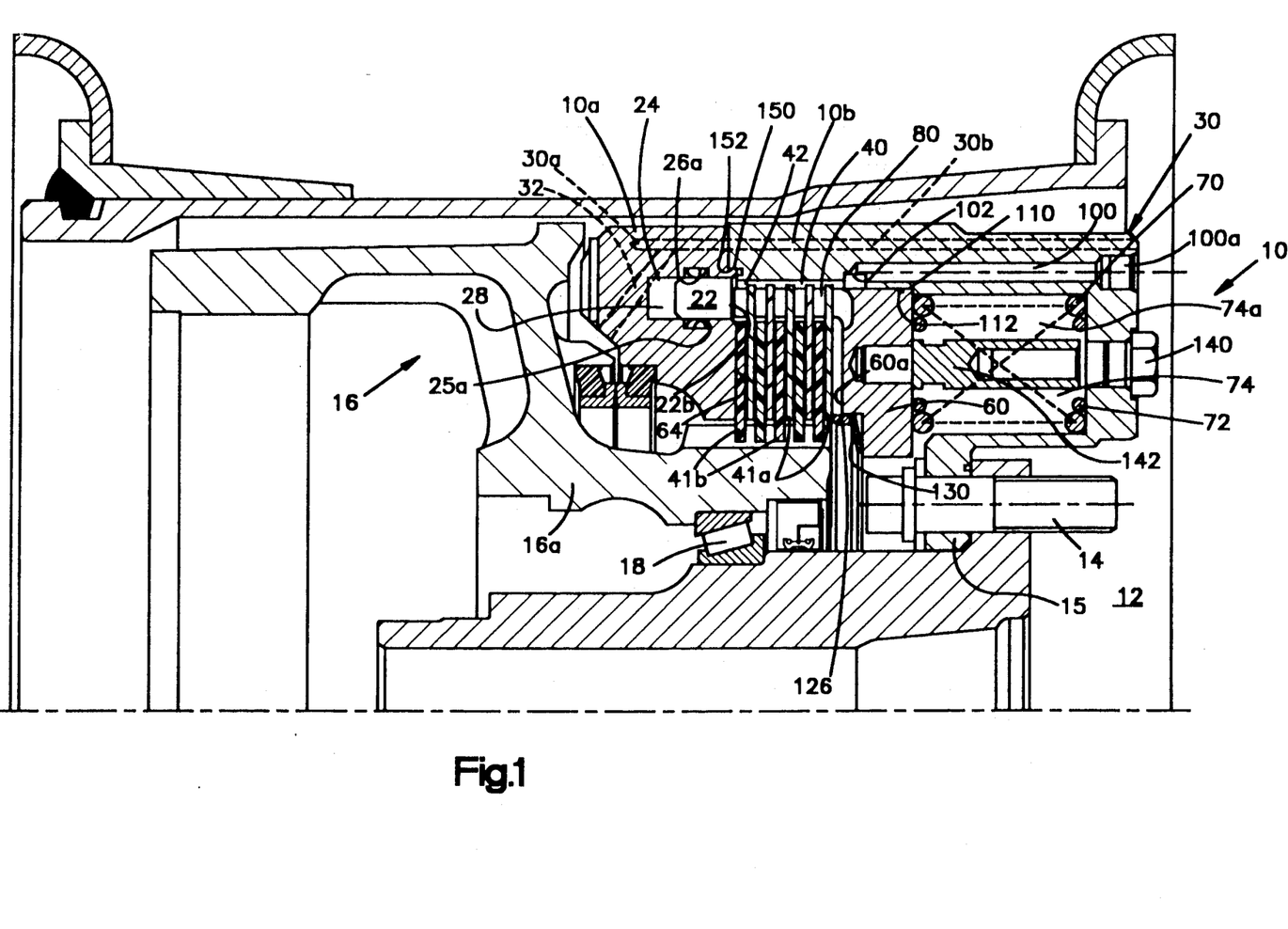
FIG. 1 is a fragmentary, sectional view showing a brake unit and attached wheel assembly constructed in accordance with the preferred embodiment of the invention.

FIG. 1 illustrates in cross-section, a wet disc brake unit 10 embodying the present invention. In the illustrated embodiment, the brake unit 10 is attached, in a conventional manner, to an axle housing 12 by a plurality of mounting bolts 14 which extend through apertures 15 formed in the brake housing. The brake unit 10 is of the spring applied/hydraulically released (SAHR) type brake unit.

The axle housing 12 rotatably supports a wheel hub 16 via roller bearing 18. As will be explained, the wheel hub 16 is interconnected with the brake unit 10 such that actuation of the brake unit, retards rotation in the wheel hub 16 and hence, the vehicle that it forms part of.

Figure 2:
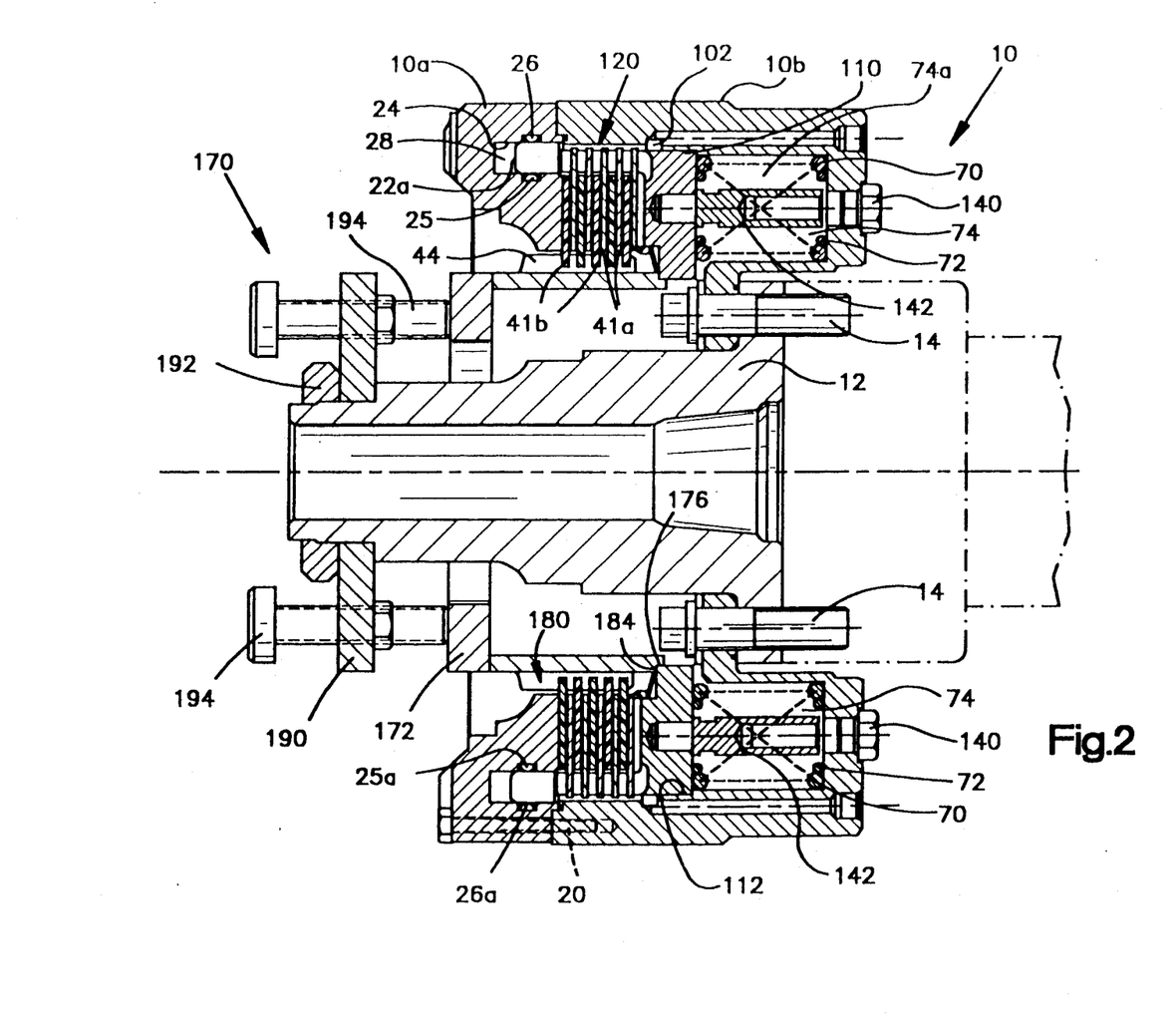
FIG. 2 is a sectional view of the brake unit showing an assembly tool in position which facilitates assembly of the brake unit while mounted to a vehicle.
Figure 3:
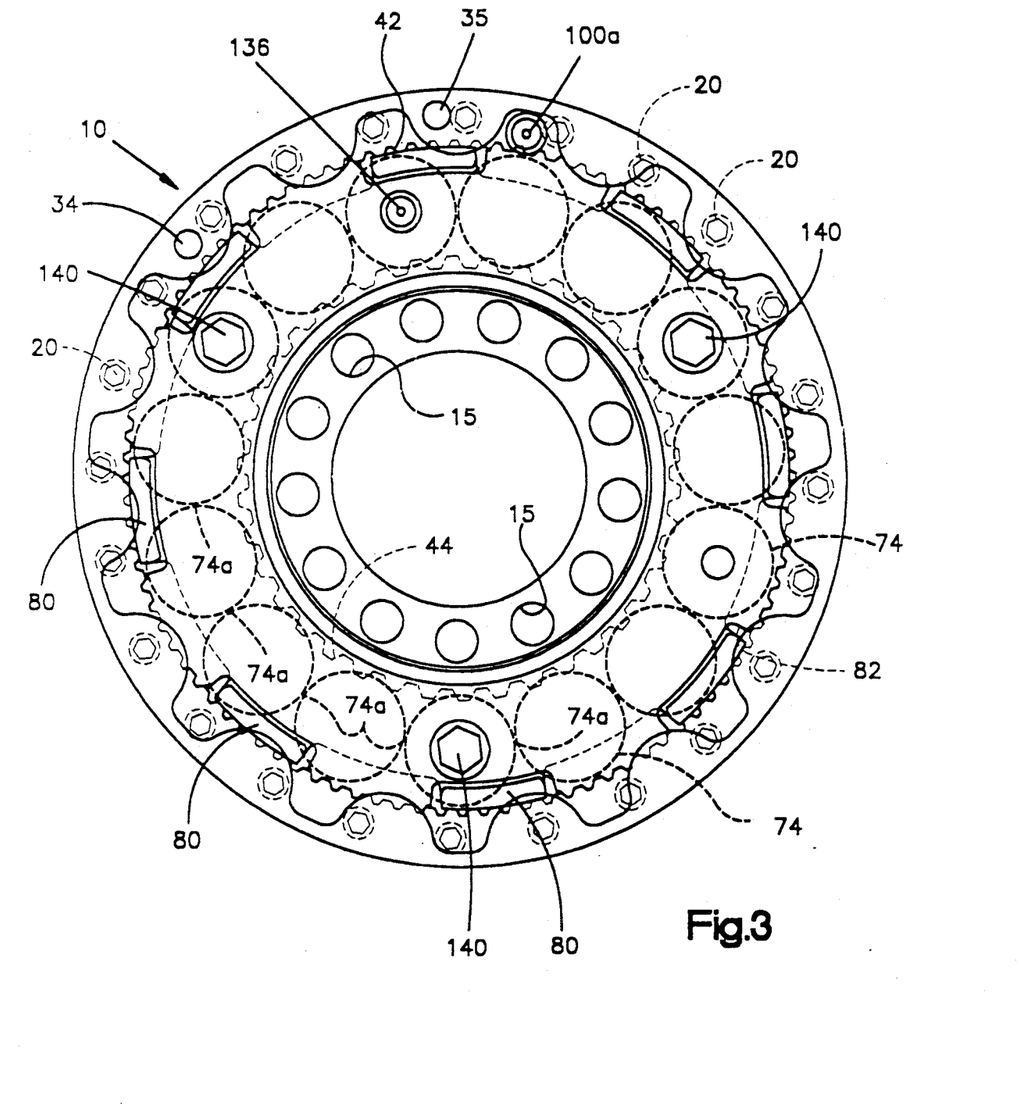
FIG. 3 is an inside end view of the brake unit with parts removed for clarity.
Figure 4:
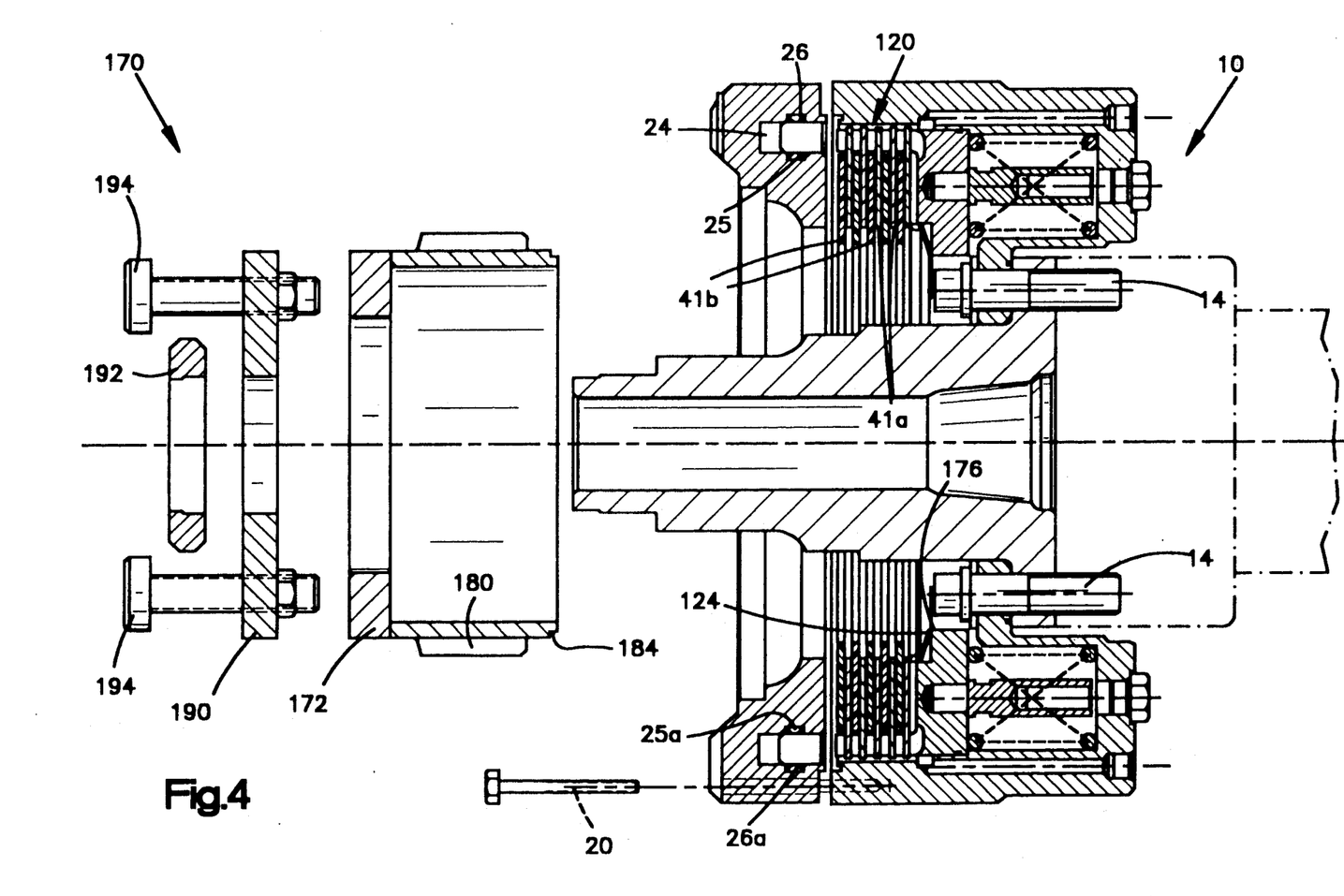
FIG. 4 is an exploded, sectional view of the apparatus shown in FIG. 2.

Referring also to FIG. 2, the brake unit 10 includes an end cap 10a bolted to a brake housing 10b by a plurality of assembly bolts 20 (see also FIGS. 3 and 4). In the illustrated and preferred construction, the end cap 10a mounts an annular piston 22 in an annular channel 24 integrally formed in the end cap. A pair of annular seals 25, 26 carried in grooves 25a, 26a sealingly engage the piston 22. As viewed in FIG. 2, the annular piston 22 is reciprocally mounted within the groove and defines a piston chamber 28 between an outer end face 22a and the annular groove. Pressurized fluid, communicated by way of feed passage 30 and branch passage 32 acts on the piston end face 22a and urges the piston 22 towards the right as viewed in FIG. 2. The supply passage 30 is defined by laterally aligned bores 30a, 30b formed in the piston housing 10a and brake housing 10b. The passage terminates in a port 34 (shown in FIG. 3) and is connected to a brake conduit (not shown) forming part of the brake control system. A bleed port 35 is also provided.

When assembled, the housing 10b defines a disc chamber 40 in which a plurality of interleave, non-rotating and rotating brake discs are disposed 41a, 41b, respectively. The non-rotating discs are fixed to or "grounded" to the brake housing 10b by means of internal splines 42 formed on the inner periphery of the brake housing 10b. The non-rotating discs include matching splines 43 (see FIG. 5) which engage the brake housing splines, as is conventional. The rotating discs 41b include internal teeth 45 (see FIG. 6) which, as seen in FIGS. 2 and 3, engage splines 44 formed on a hub extension 16a. As should be apparent, the rotatable hub 16 is coupled to the rotating discs via the splines 44. The spline connection inhibits relative rotation between the hub 16 and the rotating discs while allowing relative axial movement between the discs and the hub.

According to the invention, the piston housing 10b also reciprocally mounts an annular pressure plate 60. The pressure plate 60 defines an internal, force applying wall 60a which is abuttably engageable with the rightmost non-rotating disc 41a (as viewed in FIG. 1). The discs 41a, 41b, which form a disc pack, retard rotation in the wheel hub 16 whenever the discs are compressed between the pressure plate wall 60a and an end wall 64 defined by the piston housing 10a. The extent to which the discs 41a, 41b are compressed determines the braking torque applied to the wheel hub 16.

According to the invention, the pressure plate 60 is urged, by a plurality of springs 70, 72, towards a brake applying position, i.e. a position at which it abuttably engages the rightmost non-rotating disc and effects compression of the disc pack between itself and the end wall 64. The springs 70, 72 are located in spring pockets 74 defined by the brake housing 10b. The pockets 74 are radially distributed around the brake housing 10b and together apply a uniform brake applying force to the pressure plate 60. In the illustrated embodiment, each spring pocket 74 mounts inner and outer, coaxially aligned coil springs 70, 72. It should be noted that other types of springs and spring arrangements are contemplated by the present invention. For example for some applications, a single coil spring in each spring pocket 74 may be suitable.

According to the invention, the annular piston 22 applies brake releasing forces to the pressure plate 60 by means of a plurality of stand-offs 80 which are integrally formed with the pressure plate 60. The stand-offs 80 extend laterally through aligned, peripheral slots 82 (see FIGS. 3 and 5) formed in the non-rotating discs 41a and abuttably engage a piston end face 22b. The axial extent of the stand-offs 80 is preferably greater than the axial width of the discs 41a, 41b when the discs are engaged. The rotating discs 41b have a radial dimension less than the radial dimension of the non-rotating discs 41a and such that their peripheries 83 (see FIG. 6) terminate short of the pressure plate stand-offs 80.

Figure 5:
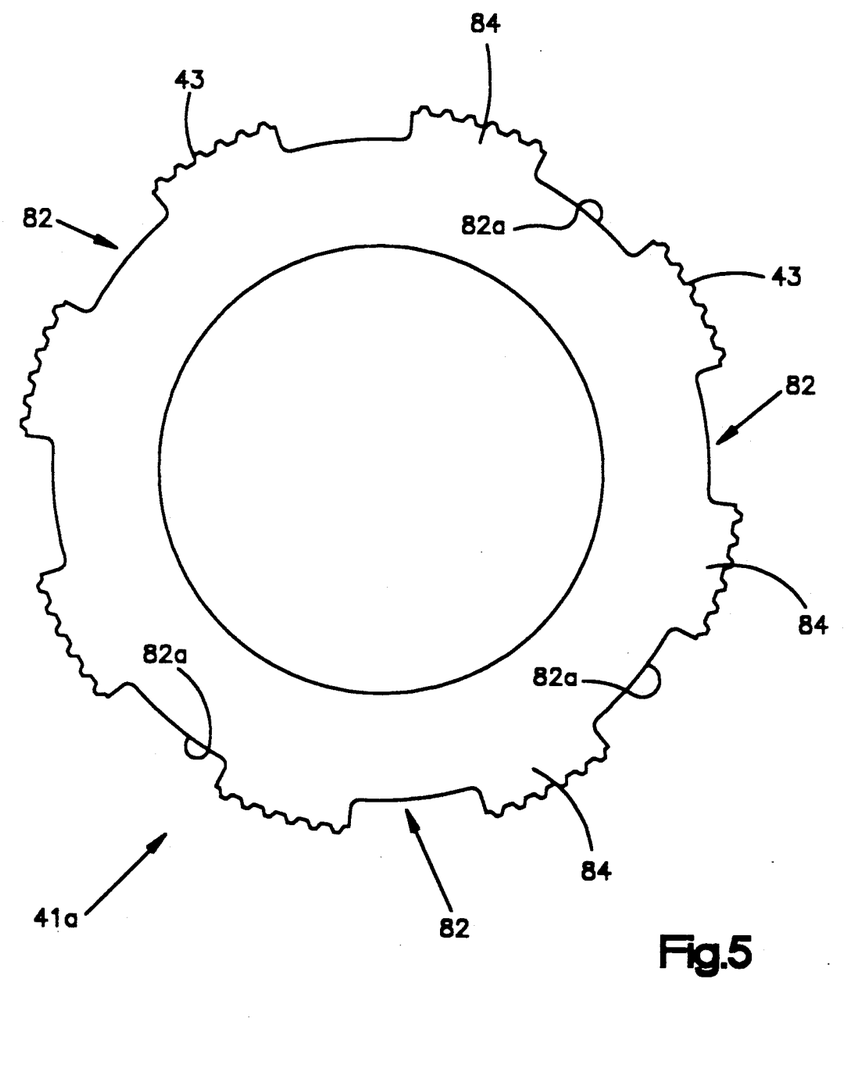
FIG. 5 is a elevational view of a non-rotating disc forming part of the brake unit; and, FIG. 6 is a elevational view of a rotating disc forming part of the brake unit.

Referring to FIG. 5, the construction of a non-rotating disc or reaction plate 41a is illustrated. As indicated above, each non-rotating disc 41a includes a plurality of peripheral slots 82. As seen best in FIG. 5, the slots 82 define a plurality of peripheral, toothed segments 84, each defining a plurality of teeth 43 which in turn, engage the internal splines 42 defined by the brake housing 10b. In the disclosed construction, eight peripheral slots 82 are defined in each disc 41a and in turn, each disc includes eight toothed segments 84.

As indicated above, the rotating discs 41b have a radial dimension such that the peripheral edge 83 (see FIG. 6) of the rotating discs 41b have a radial extent substantially equal to or less than the radial extent of the base 82a of the slots 82 see FIG. 5). Accordingly, in the illustrated construction, the pressure plate 60 includes eight stand-offs which extend axially through the slots 82 and are dimensioned such that they clear and do not interfere with the non-rotating discs 41a or the rotating discs 41b.

With the disclosed brake construction, the application of pressurized fluid to the piston chamber 28 urges the piston towards the right (as viewed in FIG. 1) which then applies a force to the pressure plate 60 in opposition to the brake applying forces exerted by the springs 70, 72. The brake is released by applying sufficient pressurized fluid to the brake chamber 28 to fully counter the spring applied force and to move the pressure plate 60 towards the right as viewed in FIG. 1, thereby unclamping the rotating and non-rotating discs 41a, 41b.

To effect braking action (under normal service), pressurized fluid in the brake chamber 28 is released to allow the spring 70, 72 to urge the pressure the plate 60 into clamping engagement with the discs 41a, 41b. The resulting frictional engagement between the non-rotating and rotating discs applies a braking torque to the hub 16. The extent of braking torque is proportional to the extent of force applied by the pressure plate 60. Consequently, the extent of braking is controlled by selectively releasing pressure (under normal operating conditions) in the piston chamber 28.

Brake systems and associated brake treadle valves (not shown) are known which operate to control the depletion of fluid pressure in a chamber as a function of pedal actuation. With these types of brake control systems, depression of the treadle valve by the operator effects the reduction of pressure in the brake piston chamber 28, the extent of which depends on the extent of brake pedal actuation. With the disclosed brake, a failure in the hydraulic system causes application of the brake since a resulting reduction in fluid pressure in the brake piston chamber 28 will allow the springs 70, 72 to move the pressure plate 60 into clamping engagement with the discs 41a, 41b.

Turning now to FIG. 4, the pressure plate springs 70, 72 for applying the brake are located in the spring pockets or spring chambers 74 defined by the disc housing 10b. In the disclosed embodiment, fifteen (15) spring chambers 74 are defined in the housing 10b. According to the invention, individual spring chambers 74 (as opposed to a common annular spring groove ) are defined with each chamber 74 including a bridging segment 74a extending between an outer portion of the brake housing 10b and an inner portion. These bridging segments 74a add rigidity to the overall brake unit and act as radial ribs extending across an inner face of the brake housing 10b.

According to a feature of the invention, coolant is circulated throughout the braking chamber 40 to remove heat generated during braking. In the preferred embodiment, coolant is communicated to the disc chamber 40 by way of a passage 100 that terminates, at its inner end, in a port 100a to which a coolant feed conduit (not shown) is connected. An annular groove 102 defined by the brake housing communicates with the outer end of the coolant passage 100 and distributes coolant throughout the brake chamber 40. According to a feature of the invention, an annular sealing ring 110 is carried in a pressure plate groove 112 and sealingly engages an inside wall of the brake chamber 40. The seal ring 110 inhibits the flow of coolant past the pressure plate 60 and into the spring chambers 74. Instead, the coolant flows from the annular groove 102 into a peripheral, disc pack region 120 (shown on FIG. 2). From there, the coolant flows in a general radial direction between the discs 41a, 41b, in coolant grooves formed in at least some of the discs.

According to the preferred embodiment, a seal is provided between the pressure plate 60 and the adjacent non-rotating disc 41a to inhibit the flow of coolant between these two components. It should be recognized, that the heat generated during braking is generated between the frictional surfaces of the rotating and non-rotating discs. In order to maximize efficiency of the cooling system, the flow of coolant is controlled so that in general, it is confined such that it is encouraged to flow between the frictional surfaces of the non-rotating and rotating discs 41a, 41b. To achieve this feature, a spring loaded, annular seal 126 (see FIG. 1) is carried by the pressure plate 60 and sealingly engages the adjacent, non-rotating disc 41a. In the preferred embodiment, the seal 126 is urged toward sealing contact with the adjacent non-rotating disc 41a by a Belleville spring 130. Whenever the pressure plate 60 is moved into its retracted position whereby the disc pack is released, the Belleville spring 130 acting upon the face seal 126, maintains contact between the seal and the non-rotating disc 41a and pressure plate 60. As a result, the flow of coolant between the non-rotating pressure plate 60 and the adjacent non-rotating disc 41a is inhibited. The preferred face seal is made from a glass filled teflon or similar material.

Figure 6:
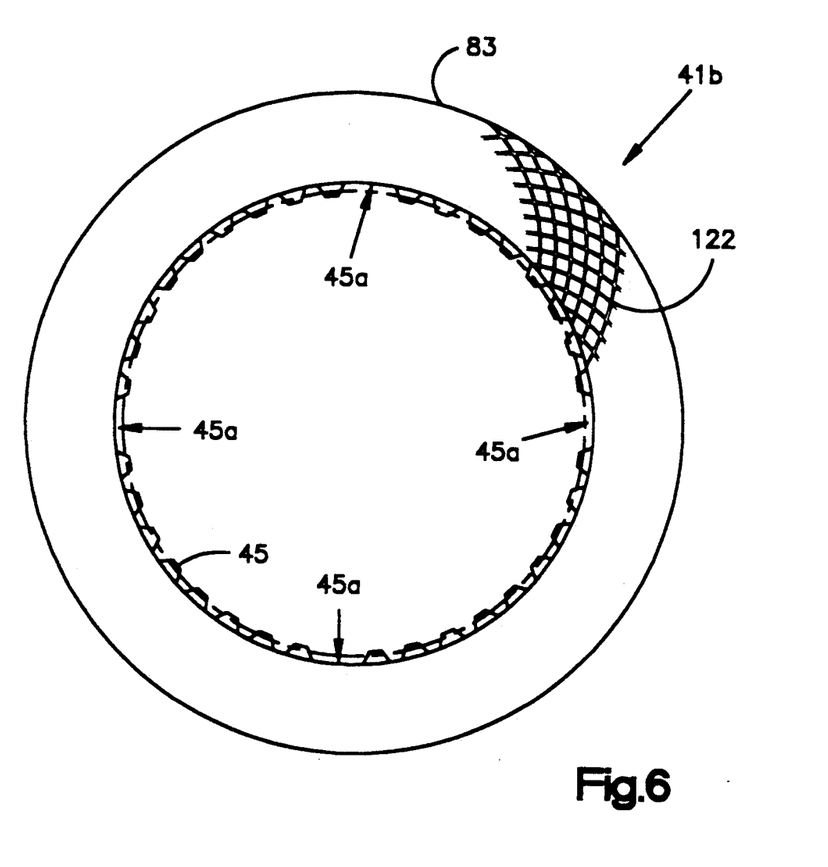

The coolant, after traveling between the disc pack, flows through ports or passages formed near the hub 16a and then travels towards the spring chambers 74. Referring to FIG. 6, in the preferred embodiment, the coolant passages or ports near the hub 16a are formed by removing selected teeth 45 from the rotating discs 41b. In the illustrated embodiment teeth at the locations 45a are removed from the discs 41b. During brake assembly, the discs 41b are mounted with the locations 45a aligned so that a passage is formed between the discs 41b and the hub 16a. Alternately, selected splines from the hub 16a may be removed to define the passages.

The coolant leaves the brake unit through an outlet port 136 (see FIG. 3) defined by one of the spring chambers 74. In the preferred embodiment, the port 136 is defined in a spring chamber 74 located near the top of the unit. With the disclosed cooling path, highly efficient heat removal is achieved and the bypassing of coolant around the disc pack, where it is needed most, is inhibited.

As described above, the loss of pressurized fluid, either through operator action or a failure in the brake system, enables the spring 70, 72 to apply the brakes. According to a feature of the invention, provision is made to mechanically release the discs 41a, 41b should pressurized fluid be unavailable. According to this feature, several spring chambers 74 include an access plug 140. In the springs chambers that include this access plug, pull rods 142 are connected to the pressure plate 60. By removing the plugs 140, threaded jack bolts of suitable length (not shown) can be used to engage the pull rods 142 to retract the pressure plate 60 thereby releasing the brake to enable the vehicle to be moved. It should be noted, that permanent bolts can also be provided with suitable seals which would be used in a similar manner, to pull the pressure plate 60 towards the right (as viewed in FIG. 1) to release the brake in the absence of pressurized fluid.

To further rigidize the overall unit, the end cap 10a is piloted into the brake housing 10b. In particular, the end cap 10a is formed with a stepped annular portion or extension 150 which is sized to be received in an annular opening 152 formed in the brake housing 10b. Once assembled, the engagement between the brake housing 10b and the annular extension 150 formed in the end cap, rigidizes the piston groove 24 and reduces or inhibits spreading of the inner and outer walls of the groove 24 due to pressurization of the piston chamber 28.

With the disclosed brake unit construction, access to the disc pack can be obtained without requiring complete removal of the brake unit. In order to perform service on the disc pack and/or piston 22, the wheel hub 16 is removed and then the end cap bolts 20 are removed in order to release the end cap 10a from the brake housing 10b. Referring to FIG. 2, a tool 170 is provided for facilitating reassembly of the brake unit. As should be apparent, since the pressure plate 60 is under spring load due to the springs 70, 72 located in the spring pockets 74, the end cap 10a must be installed by compressing the springs during assembly. Upon reassembly, the disc pack is tightly clamped between the pressure plate 60 and the end wall 64 since pressurized fluid to the piston chamber 28 is absent.

During assembly, the rotating discs 41b must be aligned to enable mounting of the hub 16a of the wheel hub 16. In order to maintain alignment of the rotating discs 41b during reassembly, the tool 170 is provided which compresses the springs 70, 72 and maintains alignment of the rotating discs 41b. In the preferred embodiment, an alignment member 172 is provided which is engageable with the inner splines formed on the rotating discs 41b. The pressure plate 60 includes structure defining a shoulder or lip 176 which is engageable by the alignment member 172.

In the preferred embodiment, the alignment member 172 includes mating splines 180 which are engageable with the aligned teeth 45 defined by the rotating discs 41b. The alignment member 172 also defines a shoulder 184 which abuttably engages the inner lip 176 of the pressure plate 60. A jack plate 190 is held to the axle spindle by a conventional spindle nut 192 and threadedly mounts a plurality of jack bolts 194 which extend axially and engage the alignment member (as best shown in FIG. 2). By gradually torquing the jack bolts 194, the alignment member 172 is moved inwardly, pushing the pressure plate 60 in a brake release direction, thus, compressing the brake applying springs 70, 72. After the end cap or piston housing 10a and all other components are installed, the jacking force is released on the alignment member 172 by unthreading the jack bolts 194. Since brake pressure in the piston chamber 28 is absent, the springs 70, 72 clamp the rotating and non-rotating discs 41a, 41b between the pressure plate 60 and the end wall 64. This spring applied force maintains the relative positions between the rotating and non-rotating discs 41a, 41b allowing the alignment member 172 and jacking member 190 to be removed from the axle housing 12. The wheel hub 16 can then be installed onto the axle housing 12 with the splined portion 16a engaging the rotating discs 41b, as seen in FIG. 1.

Although the invention has been described with a certain degree of particularity, it should be understood that those skilled in the art can make various changes to it without departing from the spirit or scope of the invention as hereinafter claimed.

We claim:

1. A wet disc brake unit for a wheeled vehicle comprising:
   a) a piston housing reciprocally mounting an annular piston;
   b) a disc housing secured to said piston housing and defining a disc chamber in which a plurality of interleaved, rotating and non-rotating discs are disposed;
   c) an annular pressure plate for applying clamping forces to said disc pack;
   d) annular seal means carried by said pressure plate and operative to sealingly engage an adjacent disc member to inhibit coolant flow between said disc member and said pressure plate when said pressure plate is spaced from said adjacent disc; and
   e) means biasing said seal means towards engagement with said disc member such that said seal means maintains sealing engagement with said disc member when said pressure plate moves to a retracted position.

2. The apparatus of claim 1 wherein said pressure plate is urged in a brake applying direction by a plurality of biasing springs located in spring chambers and said annular piston is operative to apply forces in opposition to said springs in order to urge said pressure plate in a brake releasing direction.

3. The apparatus of claim 2 wherein said pressure plate includes a plurality of peripheral, axially extending stand-offs which are abuttably engageable with an end face of said annular piston.

4. The apparatus of claim 3 wherein said non-rotating discs include a plurality of peripheral slots through which said stand-offs defined by said pressure plate extend.

5. The apparatus of claim 4 further including seal means between said pressure plate and said brake housing, said seal means between said pressure plate and brake housing inhibiting fluid flow between said pressure plate and said housing in order to direct said fluid flow between said interleaved rotating and non-rotating discs.

6. The apparatus of claim 5 wherein said piston housing includes a male extension member engageable with socket structure defined by said brake housing wherein said brake housing serves to maintain position of piston chamber walls during pressurization of said piston chamber.

7. The apparatus of claim 2 further including pressure plate retracting means including pull rods attached to said pressure plate engageable with threaded retractors mounted in certain of said spring chambers.

8. The apparatus of claim 2 wherein said pressure plate defines an assembly tool engaging structure engageable by an assembly tool whereby forces in opposition to said springs are applied to said pressure plate.

9. The apparatus of claim 8 wherein said engaging structure comprises a lip formed on an inner periphery of said pressure plate.

10. The apparatus of claim 2 wherein said biasing springs are located in associated spring chambers formed in said disc housing, said spring chambers including bridging segments extending from an outer portion of said brake housing to an inner portion of said brake housing.

11. A wet disc brake unit for wheeled vehicle, comprising:
   a) a piston housing reciprocally mounting an annular piston for axial movement towards and away from a disc housing;
   b) said disc housing secured to said piston housing and defining a disc chamber in which a plurality of interleaved, friction and reaction plates are disposed;
   c) an annular pressure plate mounted for reciprocating movement within said disc housing towards and away from said disc chamber;
   d) spring means applying forces to said annular pressure plate urging it toward clamping engagement with said discs in said disc chamber;
   e) said disc housing defining a plurality of spring chambers, each chamber including one of said spring means and defining a bridging segment extending from an outer to an inner portion of said disc housing to provide rigidizing structure for said disc housing;
   f) one of said spring chambers defining an outlet for coolant;
   g) seal means for providing sealing engagement between a periphery of said pressure plate and said disc housing whereby coolant flow from said disc chamber, across said pressure plate is inhibited.

12. The apparatus of claim 11 further comprising a disc pack seal for inhibiting coolant flow between a force applying face of said pressure plate and an adjacent disc.

13. The apparatus of claim 12, wherein said pressure plate includes a plurality of axially extending abutments having an axial extent at least slightly greater than a width of said friction and reaction plates when said discs are in clamping engagement.

14. The apparatus of claim 12, wherein coolant flow passages are defined between aligned locations on said friction plates and a wheel hub member engaged by said friction plates.

15. The apparatus of claim 14, wherein said aligned locations are defined by a tooth spacing located intermediate adjacent teeth on said friction plates.

16. A wet disc brake unit for a wheeled vehicle comprising:
   a) a piston housing reciprocally mounting a piston means for movement between extended and retracted positions;
   b) a disc housing associated with said piston housing and defining a disc chamber in which a plurality of interleaved rotating and non-rotating discs are disposed;
   c) said piston means including structure for applying clamping forces to said disc pack;
   d) seal means carried by said piston means and operative to sealingly engage an adjacent disc member of said disc pack to inhibit fluid flow between said disc member and said piston means; and,
   e) means biasing said seal means toward engagement with said disc member, such that sealing engagement between said disc member and said seal means is maintained when said piston means is moved to its retracted position.

17. The wet disc brake of claim 16, wherein said piston means comprises an annular piston reciprocally mounted within said piston housing and an annular pressure plate operatively engageable by said piston for applying clamping forces to said disc pack.

18. The apparatus of claim 17, wherein said seal means comprises an annular seal member carried by said pressure plate.

* * * * *